US012562576B2

(12) United States Patent
Hanaoka et al.

(10) Patent No.: US 12,562,576 B2
(45) Date of Patent: Feb. 24, 2026

(54) CONTROL APPARATUS, POWER SUPPLY SYSTEM, CONTROL METHOD AND PROGRAM

(71) Applicant: NTT, Inc., Tokyo (JP)

(72) Inventors: Naoki Hanaoka, Tokyo (JP); Toru Tanaka, Tokyo (JP); Naomichi Nakamura, Tokyo (JP); Yuji Higuchi, Tokyo (JP)

(73) Assignee: NTT, Inc., Tokyo (JP)

( * ) Notice: Subject to any disclaimer, the term of this patent is extended or adjusted under 35 U.S.C. 154(b) by 0 days.

(21) Appl. No.: 18/854,671

(22) PCT Filed: Apr. 11, 2022

(86) PCT No.: PCT/JP2022/017503
§ 371 (c)(1),
(2) Date: Oct. 7, 2024

(87) PCT Pub. No.: WO2023/199376
PCT Pub. Date: Oct. 19, 2023

(65) Prior Publication Data
US 2025/0233421 A1 Jul. 17, 2025

(51) Int. Cl.
*H02J 3/38* (2006.01)

(52) U.S. Cl.
CPC ..................................... *H02J 3/38* (2013.01)

(58) Field of Classification Search
CPC ........ H02J 3/38; H02J 1/00; H02J 3/00; H02J 13/00
See application file for complete search history.

(56) References Cited

FOREIGN PATENT DOCUMENTS

JP 2016-063721 4/2016

OTHER PUBLICATIONS

Naoki Hanaoka et al., IEEJ2021 General Lecture 6-056 "Study on Short Circuit Protection of Outdoor DC Power Supply System" NTT Space Environment and Energy Research Institute, Mar. 9, 2021.

*Primary Examiner* — Daniel Cavallari
(74) *Attorney, Agent, or Firm* — IPUSA, PLLC

(57) ABSTRACT

A control apparatus includes circuitry configured to communicate with a second control apparatus at a different base from the control apparatus in a power supply system, before performing power interchange, lock at least one first power feeding path for a period of time, and control a converter and one or more breakers in a power feeding network based on the first power feeding path that is determined not to intersect with a second power feeding path different from the first power feeding path, during powering.

7 Claims, 27 Drawing Sheets

CONTROL APPARATUS, POWER SUPPLY SYSTEM, CONTROL METHOD AND PROGRAM

TECHNICAL FIELD

The present invention relates to a control apparatus, a power supply system, a control method, and a program.

BACKGROUND ART

Conventionally, there are bases via which various power sources (solar power (PV: photovoltaics), wind power, or the like) and loads (an electric vehicle (EV), a storage battery, and the like) are bidirectionally connected to one another, and power interchange is enabled after performing hand-shaking between converters to allow power to be inter-changed between bases in a one-to-one bidirectional manner (without using a slot type breaker serving as a connection point) (Non Patent Literature 1).

CITATION LIST

Non Patent Literature

Non Patent Literature 1: Naoki Hanaoka et al., "Example of indoor system—Study on short-circuit protection method in outdoor DC power supply system", IEEJ 2021, General presentation 6-056

SUMMARY OF INVENTION

Technical Problem

In a future power supply system, connection points (slot type breakers) will be enabled in three directions, four directions, and the like, in addition to two directions, it is necessary to interlock handshaking and a path for n-to-n power interchange in addition to one-to-one power inter-change. However, in conventional one-to-one handshaking, there may be a problem that safety of the power feeding path cannot be ensured.

An object of a disclosed technology is to improve safety of a power feeding path in a power supply system capable of coping with a complicated network.

Solution to Problem

The disclosed technology is a control apparatus including a communication unit configured to communicate with a control apparatus of another base in a power supply system before power interchange, and a control unit configured to lock a power feeding path for a certain period of time and control a converter and a breaker that is disposed in a power feeding network on the basis of a power feeding path determined not to intersect with another power feeding path during power feeding.

Advantageous Effects of Invention

It is possible to improve the safety of a power feeding path in a power supply system capable of coping with a compli-cated network.

BRIEF DESCRIPTION OF DRAWINGS

FIG. 1 is a diagram illustrating an example of a configu-ration of a power supply system according to the present embodiment.

FIG. 16 is a diagram illustrating a configuration of the power supply system according to Example 2 of the embodi-ment of the present invention.

FIG. 19 is a first diagram for explaining a power feeding path determination method according to Example 2 of the embodiment of the present invention.

FIG. 20 is a second diagram for explaining the power feeding path determination method according to Example 2 of the embodiment of the present invention.

FIG. 22 is a diagram illustrating a hardware configuration example of a computer.

DESCRIPTION OF EMBODIMENTS

Figure 2:
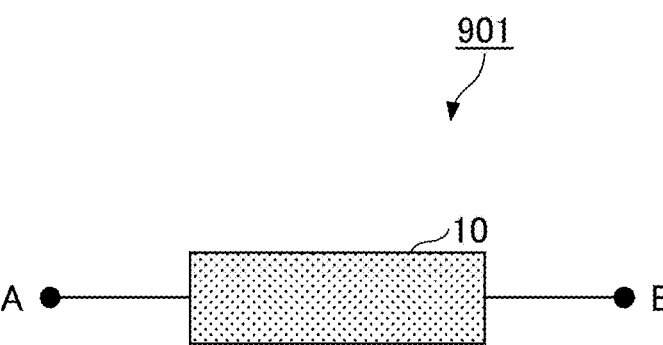
FIG. 2 is a diagram illustrating a circuit of a breaker divergently extending in two directions.

Hereinafter, an embodiment (present embodiment) of the present invention will be described with reference to the drawings. The embodiment described below is merely an example, and embodiments to which the present invention is applied is not limited to the following embodiment.

Outline of Present Embodiment

A power supply system according to the present embodiment assumes a case where various power sources (solar power (PV: photovoltaics), wind power, and the like) and loads (an electric vehicle (EV), a storage battery, and the like) are bidirectionally connected, such as a case where the power supply system is used outdoors. Therefore, connection points allows not only two directions but also three directions, four directions, and the like, and it is necessary to customize each breaker for protection individually according to the number of branches.

Note that the breaker according to the present embodiment may be a DC breaker or an AC breaker. Moreover, the breaker according to the present embodiment may be any of a mechanical type, a hybrid type, and a semiconductor type.

Figure 1:
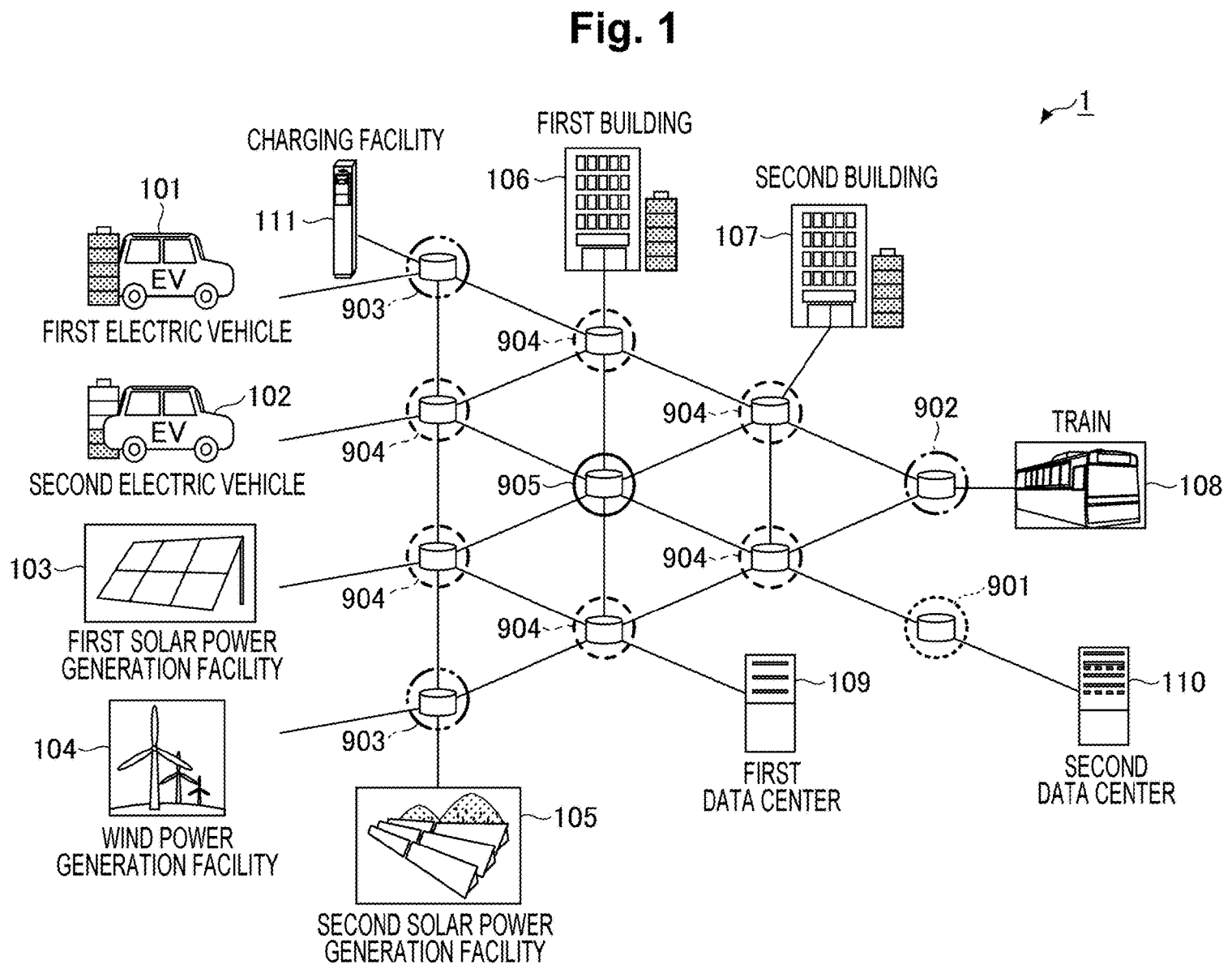

FIG. 1 is a diagram illustrating an example of the configuration of the power supply system according to the present embodiment. In a power supply system 1, a plurality of power sources, loads, and the like are connected with each other by a power feeding network. The power sources, loads, and the like include, for example, a first electric vehicle 101, a second electric vehicle 102, a first solar power generation facility 103, a wind power generation facility 104, a second solar power generation facility 105, a first building 106, a second building 107, a train 108, a first data center 109, a second data center 110, and a charging facility 111.

A breaker is installed at each branch point of the power feeding network. For example, a two-way breaker 901 is a breaker that divergently extends in two directions. Similarly, a three-way breaker 902 divergently extending in three directions, four-way breakers 903 divergently extending in four directions, five-way breakers 904 divergently extending in five directions, and a six-way breaker 905 divergently extending in six directions are installed at respective branch points of the power feeding network.

In a case where a customer or the like is connected by outdoor power distribution (power network of bus type, loop type, mesh type, or the like), an accident point can be actively separated in a short time in the event of an accident, by disposing a breaker at a branch point.

FIG. 2 is a diagram illustrating a circuit of the breaker divergently extending in two directions. The two-way breaker 901 includes one breaking unit 10. The breaking unit 10 is connected between A and B. The breaking unit 10 can break currents in two directions, i.e., from A to B, and from B to A.

Figure 3:
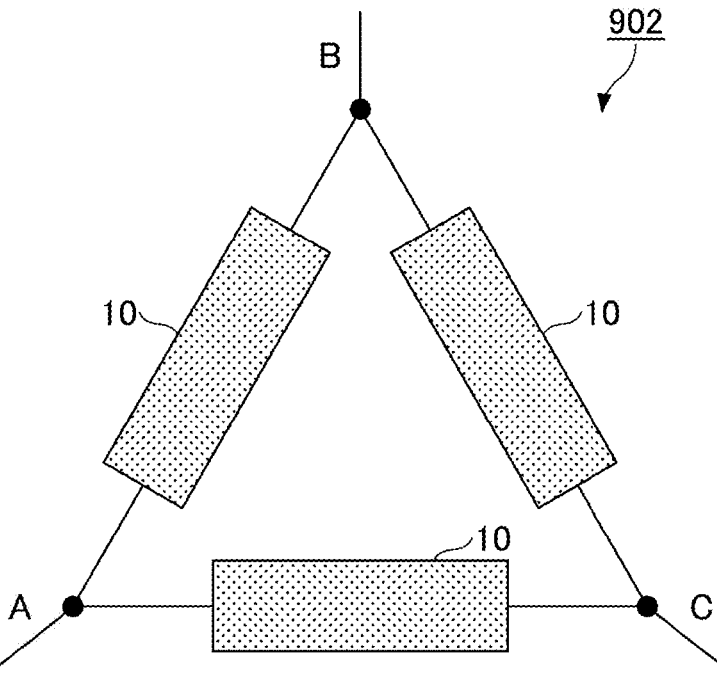
FIG. 3 is a diagram illustrating a circuit of a breaker divergently extending in three directions.

FIG. 3 is a diagram illustrating a circuit of a breaker divergently extending in three directions. A three-way breaker 902 includes three breaking units 10. The breaking units 10 are connected respectively between A and B, between B and C, and between A and C. Each breaking unit 10 can break a current in two directions between two connected points. As a result, the three-way breaker 902 can break currents in all directions that are defined by combinations of the three points A, B, and C.

Figure 4:
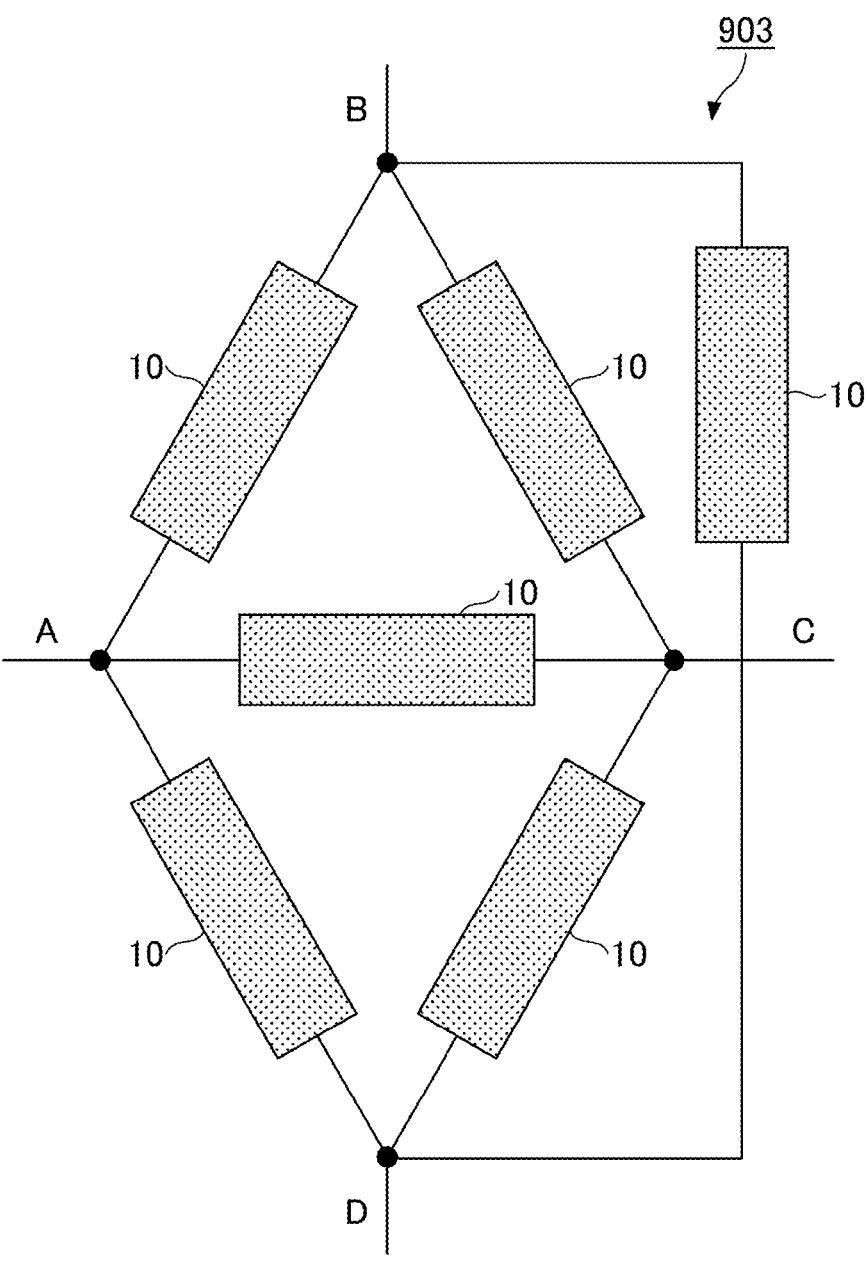
FIG. 4 is a diagram illustrating a circuit of a breaker divergently extending in four directions.

FIG. 4 is a diagram illustrating the circuit of the breaker divergently extending in four directions. A four-way breaker 903 includes six breaking units 10. The breaking units 10 are connected respectively between A and B, between A and C, between A and D, between B and C, between B and D, and between C and D. Each breaking unit 10 can break a current in two directions between two connected points. As a result, the four-way breaker 903 can break currents in all directions that are defined by combinations of the four points A, B, C, and D.

Hereinafter, Examples 1 to 3 will be described as specific examples of the present embodiment.

Example 1

In the present example, a breaker can be expanded by combining breaking units capable of divergently extending in two directions, with an external housing having a plurality of slots. Specifically, an example in which divergent extension in multiple directions, such as three directions or four directions, is enabled by changing the position of a slot into which each breaking unit is inserted will be described.

Figure 5:
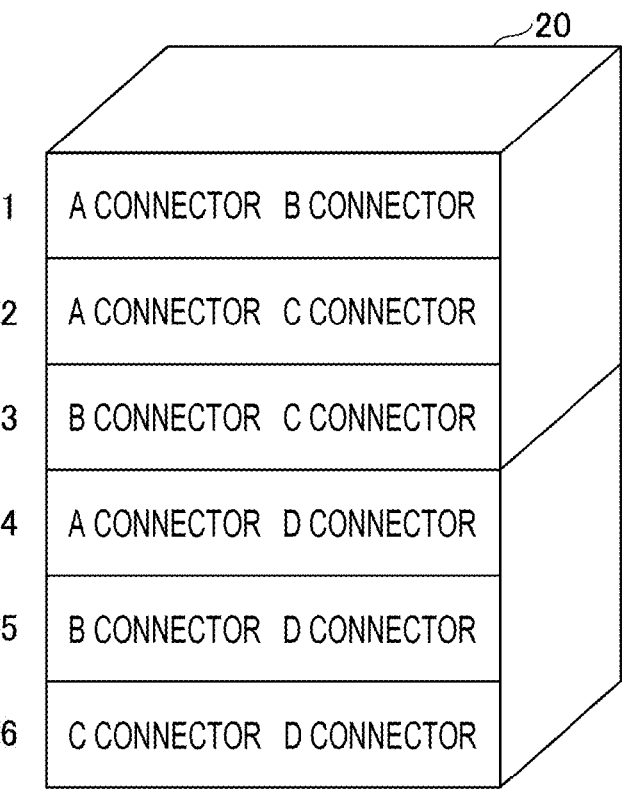
FIG. 5 is a diagram illustrating an example of the appear-ance of a housing of the breaker according to Example 1 of the embodiment of the present invention.

FIG. 5 is a view illustrating an example of the appearance of a housing of the breaker according to Example 1 of the embodiment of the present invention. A housing 20 is designed such that a plurality of (e.g., six in the example in FIG. 5) breaking units 10 can be inserted in the housing 20. The breaking units 10 inserted in the respective slots are connected between different points. For example, a breaking unit 10 inserted in a first slot is connected between a connector A and a connector B, and a breaking unit 10 inserted in a second slot is connected between the connector A and a connector C.

Figure 6:
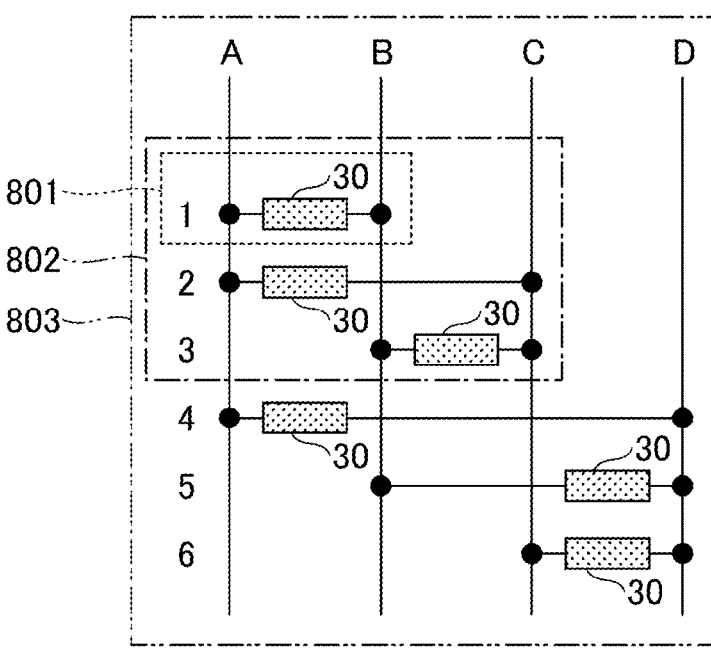
FIG. 6 is a first diagram illustrating an example of an internal wiring of the housing of the breaker according to Example 1 of the embodiment of the present invention.

FIG. 6 is a first diagram illustrating an example of an internal wiring of the housing of the breaker according to Example 1 of the embodiment of the present invention. The housing 20 illustrated in FIG. 5 has six slots 30 in which six breaking units 10 can be inserted. The breaking units 10 inserted in the respective slots 30 are wired in advance so as to be connected between different points.

For example, a circuit including the first slot 30 functions as a two-way circuit 801. A breaker including the breaking unit 10 inserted in the first slot 30 and the housing 20 functions as the two-way breaker 901.

Moreover, for example, a circuit including the first to third slots 30 functions as a three-way circuit 802. A breaker including breaking units 10 inserted in the first to third slots 30 and the housing 20 functions as the three-way breaker 902.

Moreover, for example, a circuit including the first to sixth slots 30 functions as a four-way circuit 803. A breaker including breaking units 10 inserted in the first to sixth slots 30, six in total, and the housing 20 functions as the four-way breaker 903.

Figure 7:
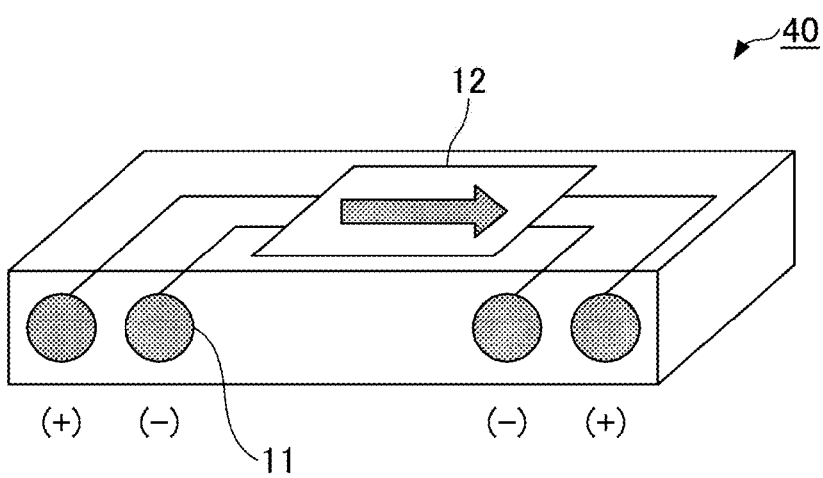
FIG. 7 is a diagram illustrating an example of a conven-tional breaking unit.

FIG. 7 is a diagram illustrating an example of a conventional breaking unit. A breaking unit 40 conventionally often used includes four connectors 11 and one internal circuit 12.

Figure 8:
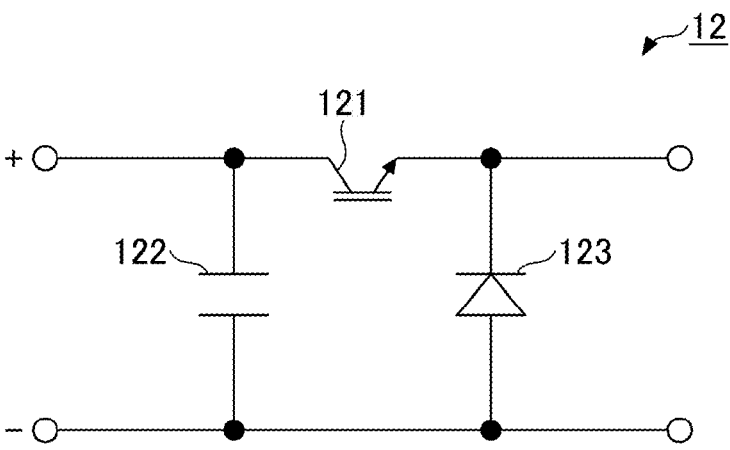
FIG. 8 is a diagram illustrating an example of an internal circuit of the conventional breaking unit.

FIG. 8 is a diagram illustrating an example of the internal circuit of the conventional breaking unit. The internal circuit 12 includes, for example, a switch 121, a capacitor 122, and a diode 123. The capacitor 122 functions to suppress voltage fluctuation when the circuit is broken in a short time. Moreover, the diode 123 functions to suppress overvoltage when the circuit is broken in a long time. Such an internal circuit 12 can break only a current in one direction.

Figure 9:
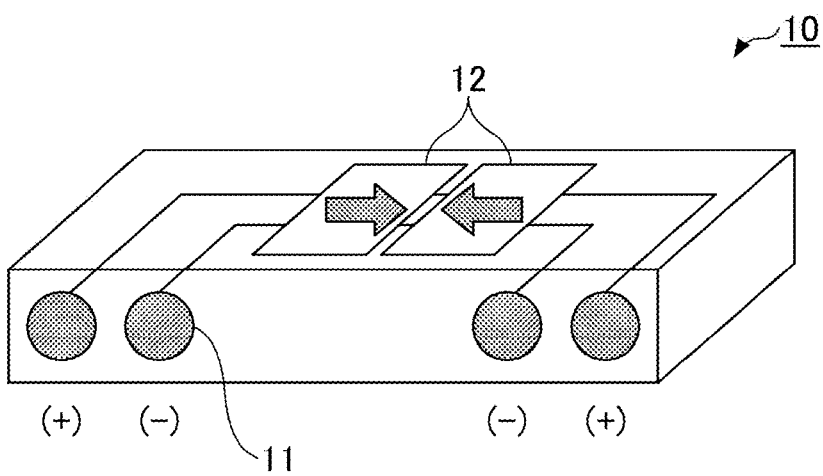
FIG. 9 is a diagram illustrating an example of a breaking unit according to Example 1 of the embodiment of the present invention.

FIG. 9 is a diagram illustrating an example of a breaking unit according to Example 1 of the embodiment of the present invention. The breaking unit 10 in this example includes four connectors 11 and two internal circuits 12. Each internal circuit 12 may be the circuit illustrated in FIG. 8. The internal circuits 12 are connected in series in opposite directions. As a result, the breaking unit 10 can break a current in two directions (bidirectional current).

A breaker divergently extending in multiple directions is configured by combining the above-described breaking units 10 and the housing 20. Although breakers divergently extending in four or less directions have been described, breakers divergently extending in five or more directions can be similarly configured.

Figure 10:
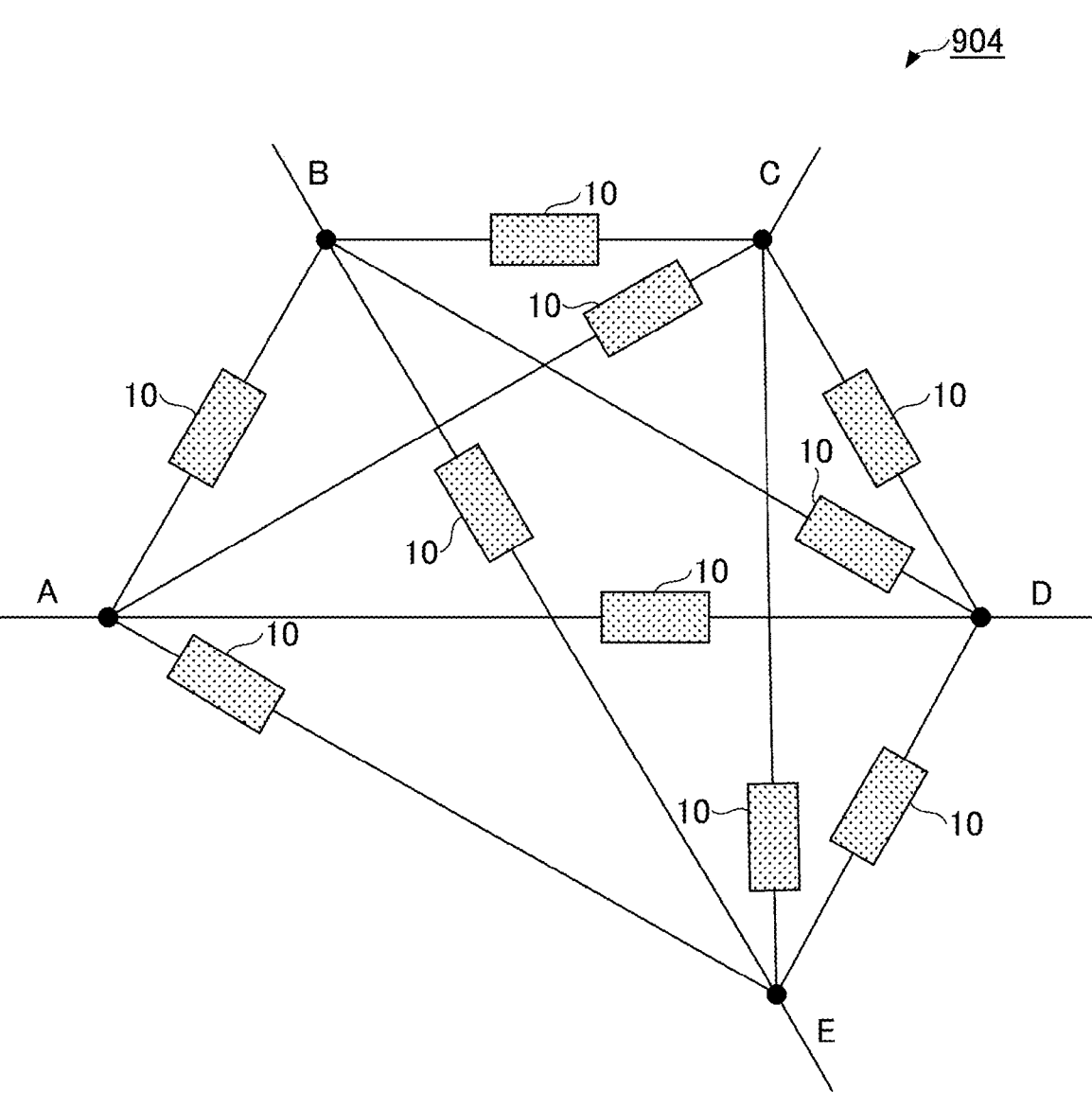
FIG. 10 is a diagram illustrating a circuit of a breaker divergently extending in five directions.

FIG. 10 is a diagram illustrating a circuit of the breaker divergently extending in five directions. A five-way breaker 904 includes ten breaking units 10. The breaking units 10 are respectively connected between A and B, between A and C, between A and D, between A and E, between B and C, between B and D, between B and E, between C and D, between C and E, and between D and E. Each breaking unit 10 can break the current in two directions between two connected points. As a result, the five-way breaker 904 can break currents in all directions that are defined by combinations of the five points A, B, C, D, and E.

Figure 11:
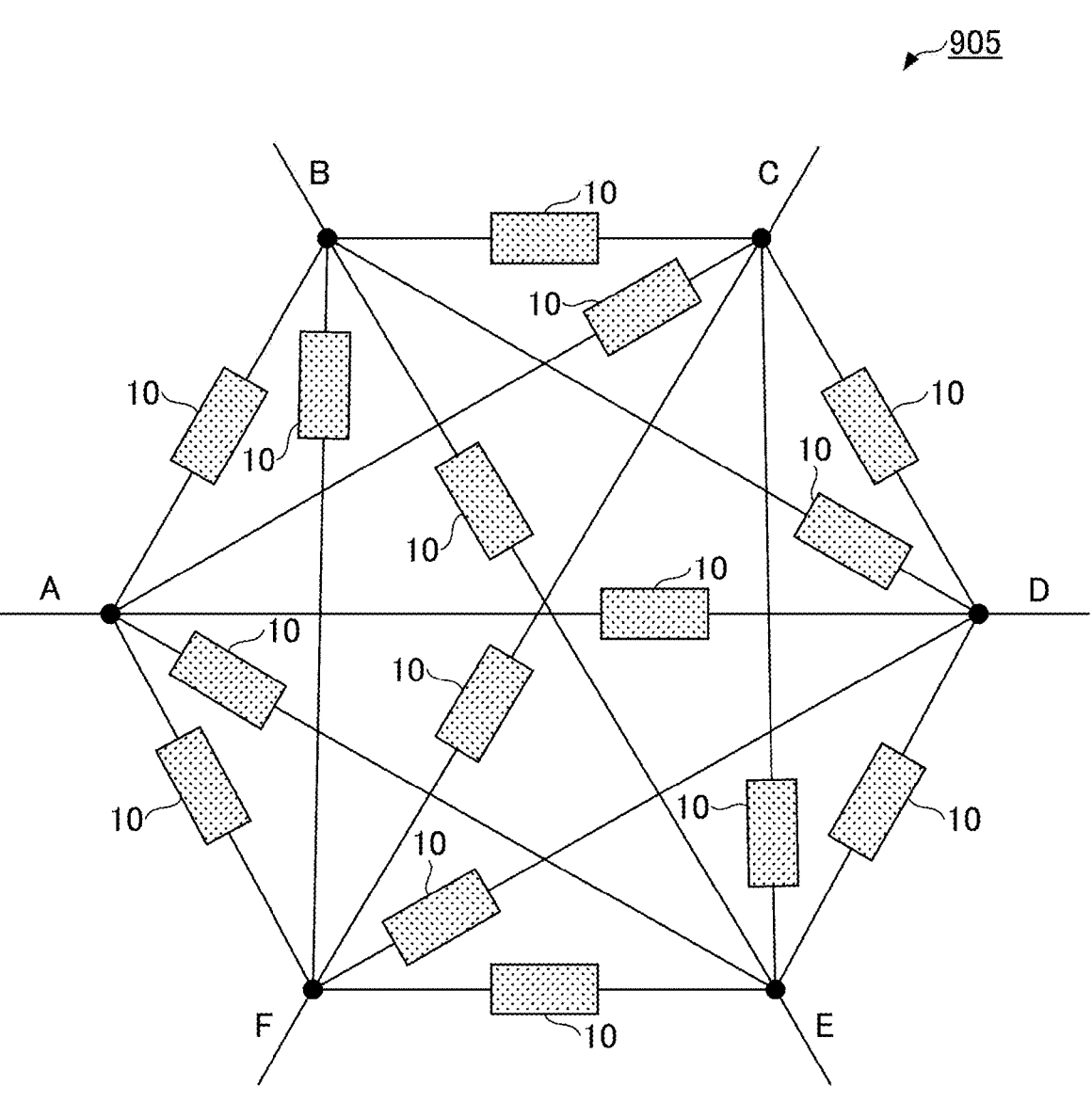
FIG. 11 is a diagram illustrating a circuit of a breaker divergently extending in six directions.

FIG. 11 is a diagram illustrating a circuit of a breaker divergently extending in six directions. A six-way breaker 905 includes fifteen breaking units 10. The breaking units 10 are respectively connected between A and B, between A and C, between A and D, between A and E, between A and F, between B and C, between B and D, between B and E, between B and F, between C and D, between C and E, between C and F, between D and E, between D and F, and between E and F. Each breaking unit 10 can break a current in two directions between two connected points. As a result, the six-way breaker 905 can break currents in all directions that are defined by combinations of the six points A, B, C, D, E, and F.

Figure 12:
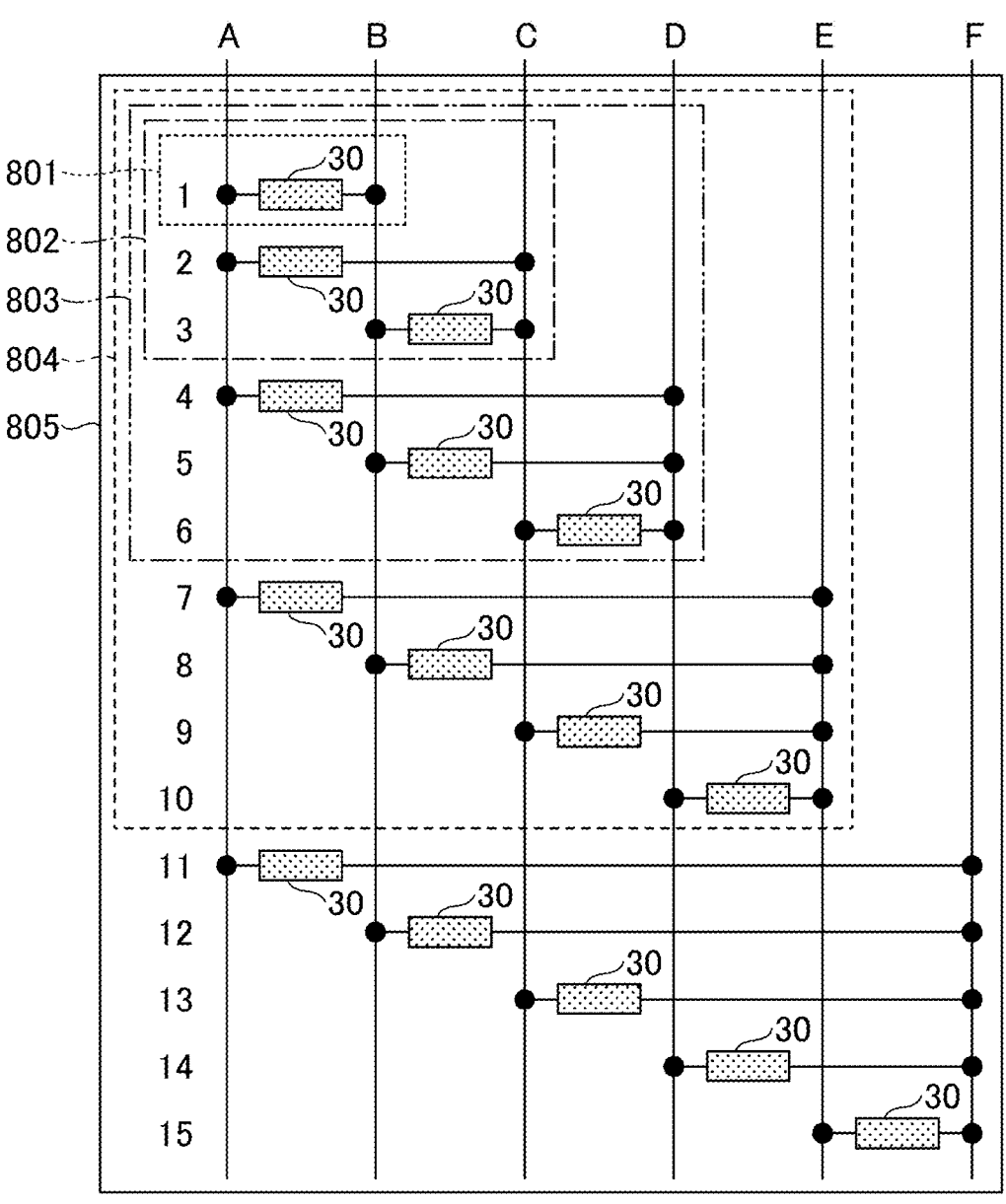
FIG. 12 is a second diagram illustrating an example of the internal wiring of the housing of the breaker according to Example 1 of the embodiment of the present invention.

FIG. 12 is a second diagram illustrating an example of the internal wiring of the housing of the breaker according to Example 1 of the embodiment of the present invention. The housing 20 has fifteen slots 30 in which fifteen breaking units 10 can be inserted. The breaking units 10 inserted in the respective slots 30 are wired in advance so as to be connected between different points.

For example, a circuit including the first slot 30 functions as a two-way circuit 801. A breaker including the breaking unit 10 inserted in the first slot 30 and the housing 20 functions as the two-way breaker 901.

Moreover, for example, a circuit including the first to third slots 30 functions as a three-way circuit 802. A breaker including breaking units 10 inserted in the first to third slots 30 and the housing 20 functions as the three-way breaker 902.

Moreover, for example, a circuit including the first to sixth slots 30 functions as a four-way circuit 803. A breaker including breaking units 10 inserted into the first to sixth slots 30, six in total, and the housing 20 functions as the four-way breaker 903.

Moreover, for example, a circuit including the first to tenth slots 30 functions as a five-way circuit 804. A breaker including breaking units 10 inserted in the first to tenth slot 30, ten in total, and the housing 20 functions as the five-way breaker 904.

Moreover, for example, a circuit including the first to fifteenth slots 30 functions as a six-way circuit 805. A breaker including breaking units 10 inserted in the first to fifteenth slots 30, fifteen in total, and the housing 20 functions as the six-way breaker 905.

Figure 13:
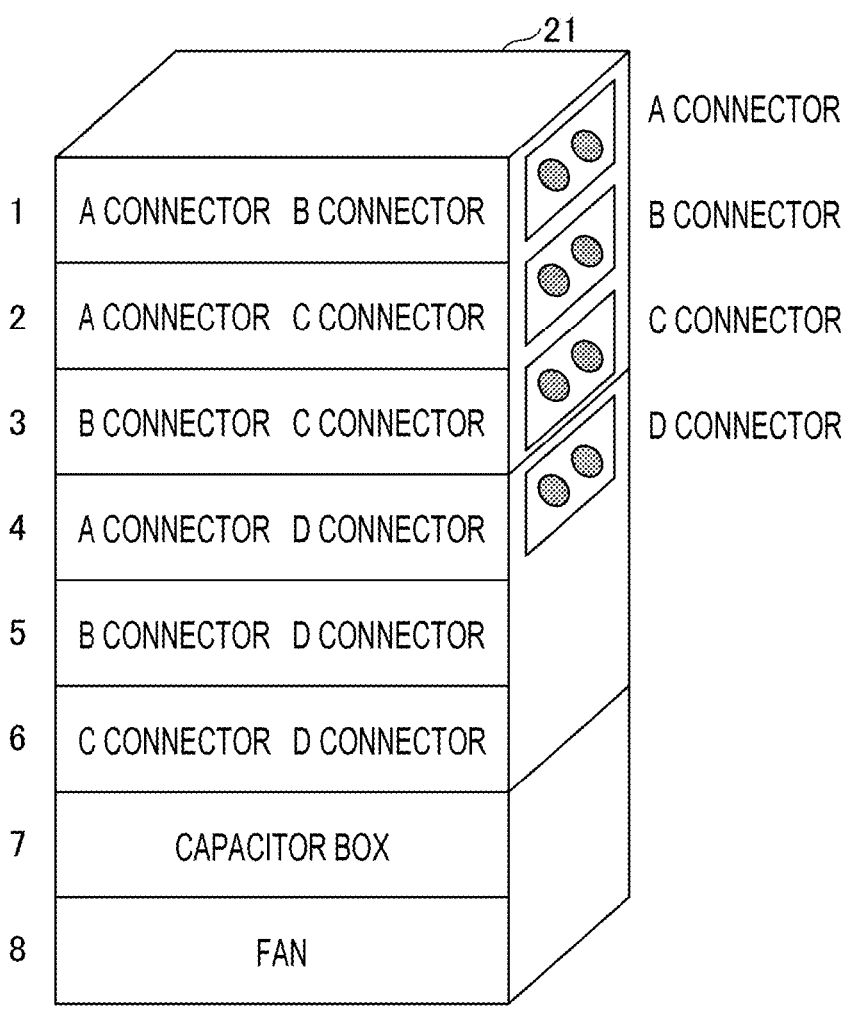
FIG. 13 is a diagram illustrating the appearance of the housing of the breaker in a modification of Example 1 of the embodiment of the present invention.

FIG. 13 is a diagram illustrating the appearance of the housing of the breaker in a modification of Example 1 of the embodiment of the present invention. A housing 21 illustrated in FIG. 13 includes six slots 30 for implementing the four-way breaker 903, and further includes a seventh slot for inserting a capacitor box and an eighth slot for inserting a fan. The capacitor box may be, for example, a capacitor that suppresses an electric arc at the time of breaking, a transient voltage countermeasure circuit, an overcurrent countermeasure circuit, or the like. Moreover, the fan may be a cooler for cooling generated heat due to conduction loss that occurs at a contact at which direct current is broken.

Moreover, the housing 21 has four connectors A to D that are directed outward. The connectors are respectively connected with various power sources, loads, and the like in the power feeding network.

According to the housing 20 (or the housing 21) and the breaking unit 10 in the present example, the configuration of the breaker divergently extending in multiple directions can be simplified by combining breaking units 10 capable of breaking the currents in two directions, with the external housing 20 having a plurality of slots. For example, since a breaker divergently extending in a plurality of types of directions can be configured with one type of breaking units 10, the breaking units 10 can be mass-produced.

Although this example has illustrated an example in which the circuit is incorporated in the housing 20 (or the housing 21), a part or all of the circuit may be incorporated in the breaking units 10.

Moreover, although an example in which a current in two directions (bidirectional current) is broken has been described using the breaking unit 10, a breaking unit that breaks the current in one direction (unidirectional current) may be used.

With the breaker according to this example, branch points in multiple directions, such as two directions, three directions, four directions, five directions, or six directions, can be configured with one type (or several types) of slot type breaker in a microgrid capable of interchanging AC power and/or DC power.

Power routing is also possible by controlling ON/OFF of the breaker according to this example for each port.

Example 2

This example will be described using a control method in which the power supply system including branch points in multiple directions as illustrated in FIG. 1 has an interlocking function of locking a one-to-one or n-to-n power feeding path for a certain period of time to secure the power feeding path so that the power feeding path does not intersect with another power feeding path during power feeding, and in the control method, a current amount for overcurrent protection (OCP) is set in the breaker so as to achieve a protection coordination function in a case where the power feeding path during power feeding branches, in order to ensure safety.

For comparison, a control in a conventional bidirectional power supply system will be described.

Figure 14:
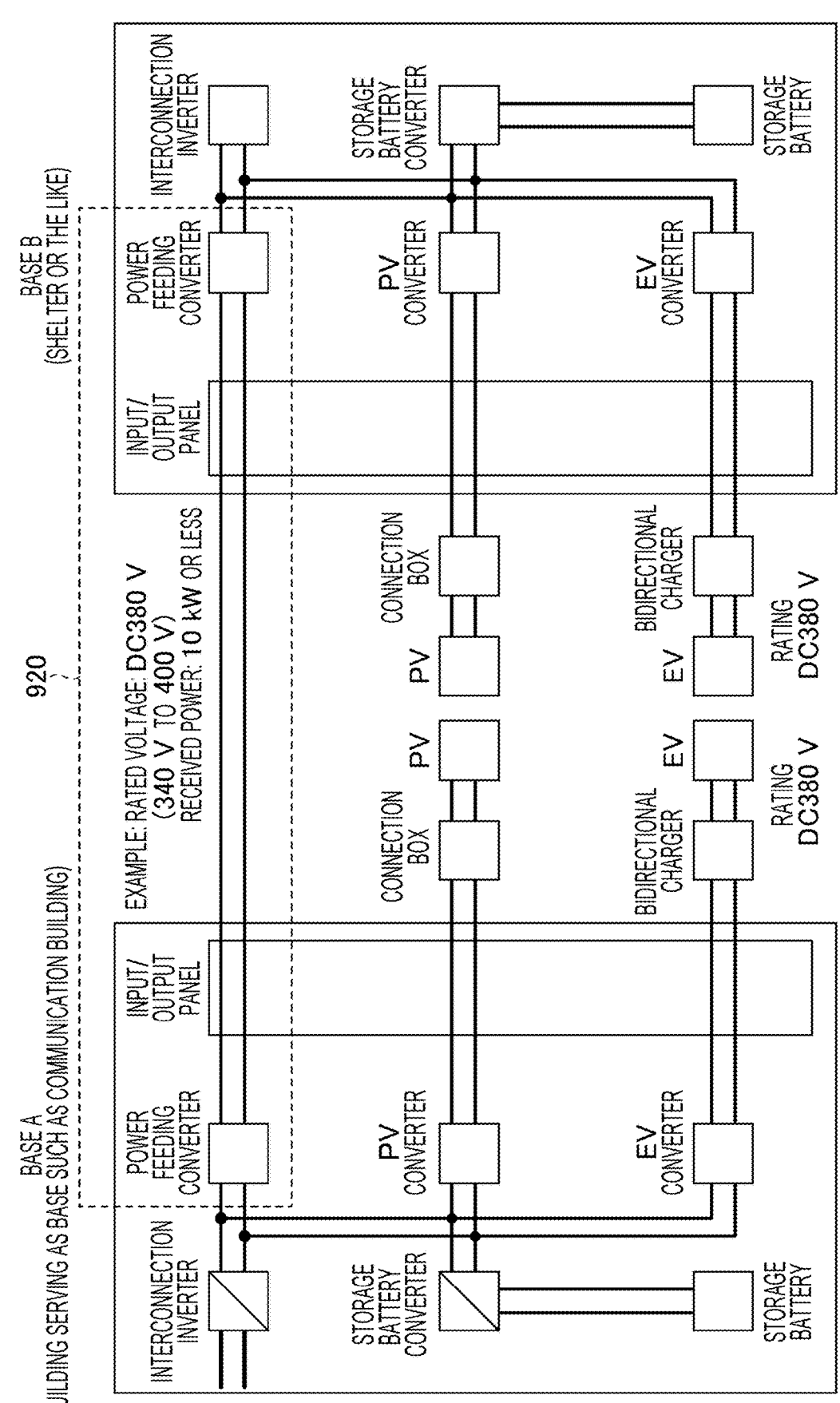
FIG. 14 is a diagram illustrating an example of a con-ventional bidirectional power supply system.

FIG. 14 is a diagram illustrating an example of the conventional bidirectional power supply system. A power supply system 920 for bidirectionally feeding power between a base A and a base B includes a power feeding converter at each base. The base A is an example of a building serving as a base such as a communication building. The base B is, for example, a shelter or the like.

Converters perform communication (handshaking) with each other and then perform power interchange. As a result, it is possible to perform the power interchange bidirectionally on a one-to-one basis between bases. Note that a breaker serving as a connection point may not be disposed between bases.

Figure 15:
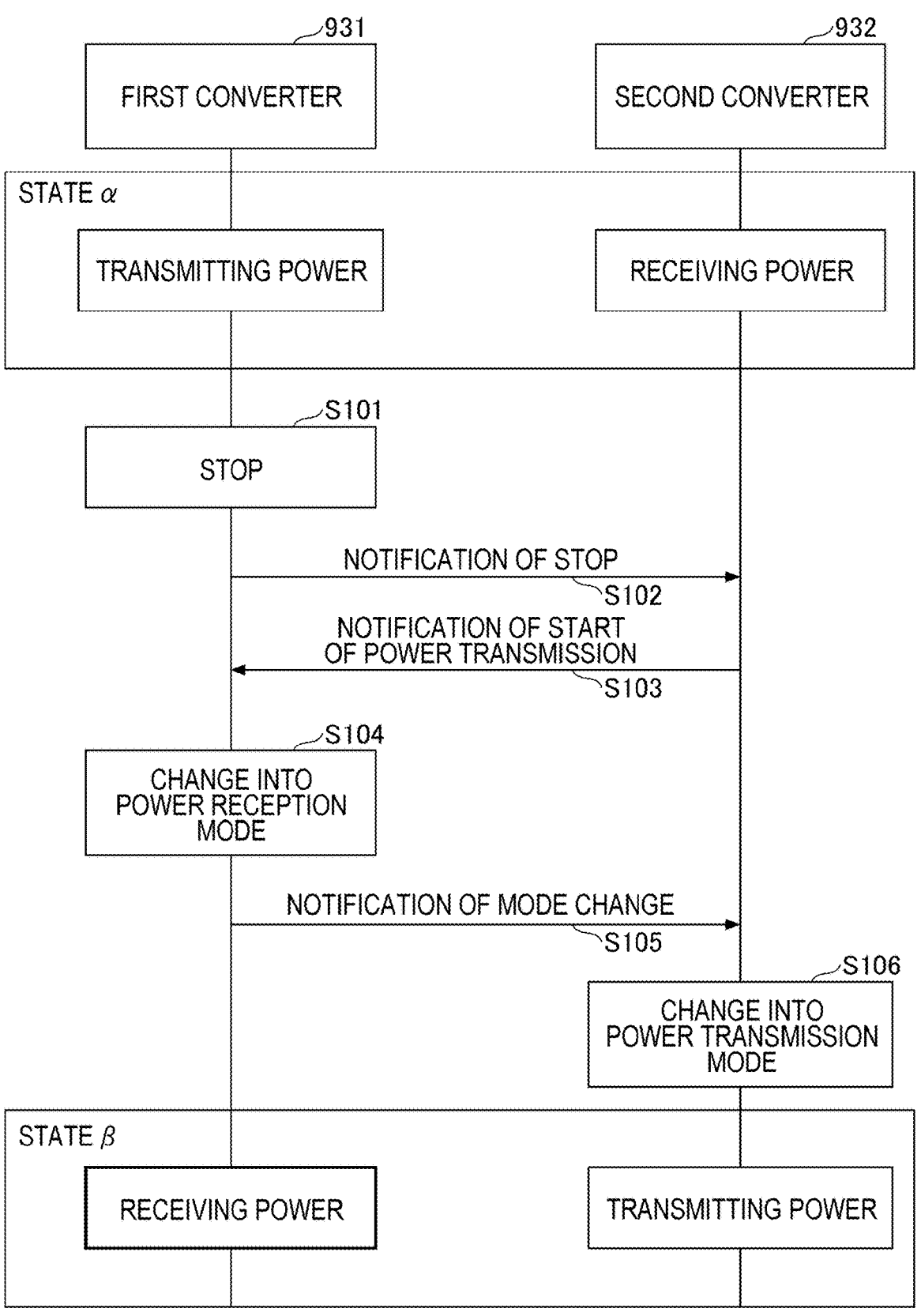
FIG. 15 is a sequence diagram illustrating an example of a flow of handshaking in the conventional bidirectional power supply system.

FIG. 15 is a sequence diagram illustrating an example of a flow of the handshaking in the conventional bidirectional power supply system. A converter disposed at the base A is referred to as a first converter 931, and a converter disposed at the base B is referred to as a second converter 932.

It is assumed that the first converter 931 is transmitting power (in a power transmission mode) and the second converter 932 is receiving the power (in a power reception mode). This state is referred to as a state α. Moreover, the state in which the first converter 931 is receiving the power (in power reception mode) and the second converter 932 is transmitting the power (in power transmission mode) is referred to as a state β.

FIG. 15 illustrates a flow of transition from the state α to the state β. The first converter 931 stops power transmission (step S101). Next, the first converter 931 notifies the second converter 932 of the stopping (step S102).

Upon receiving the notification about the stopping, the second converter 932 notifies the first converter 931 of a start of the power transmission (step S103). Upon receiving the notification about the start of the power transmission, the first converter 931 changes an operation mode to the power reception mode (step S104).

Subsequently, the first converter 931 notifies the second converter 932 of the change in the operation mode (step S105). Upon receiving the notification about the operation mode change, the second converter 932 changes the operation mode to the power transmission mode (step S106). In the above procedure, the transition from the state α to the state β is completed.

Next, a control procedure of the breaker and the converter according to this example will be described.

Figure 16:
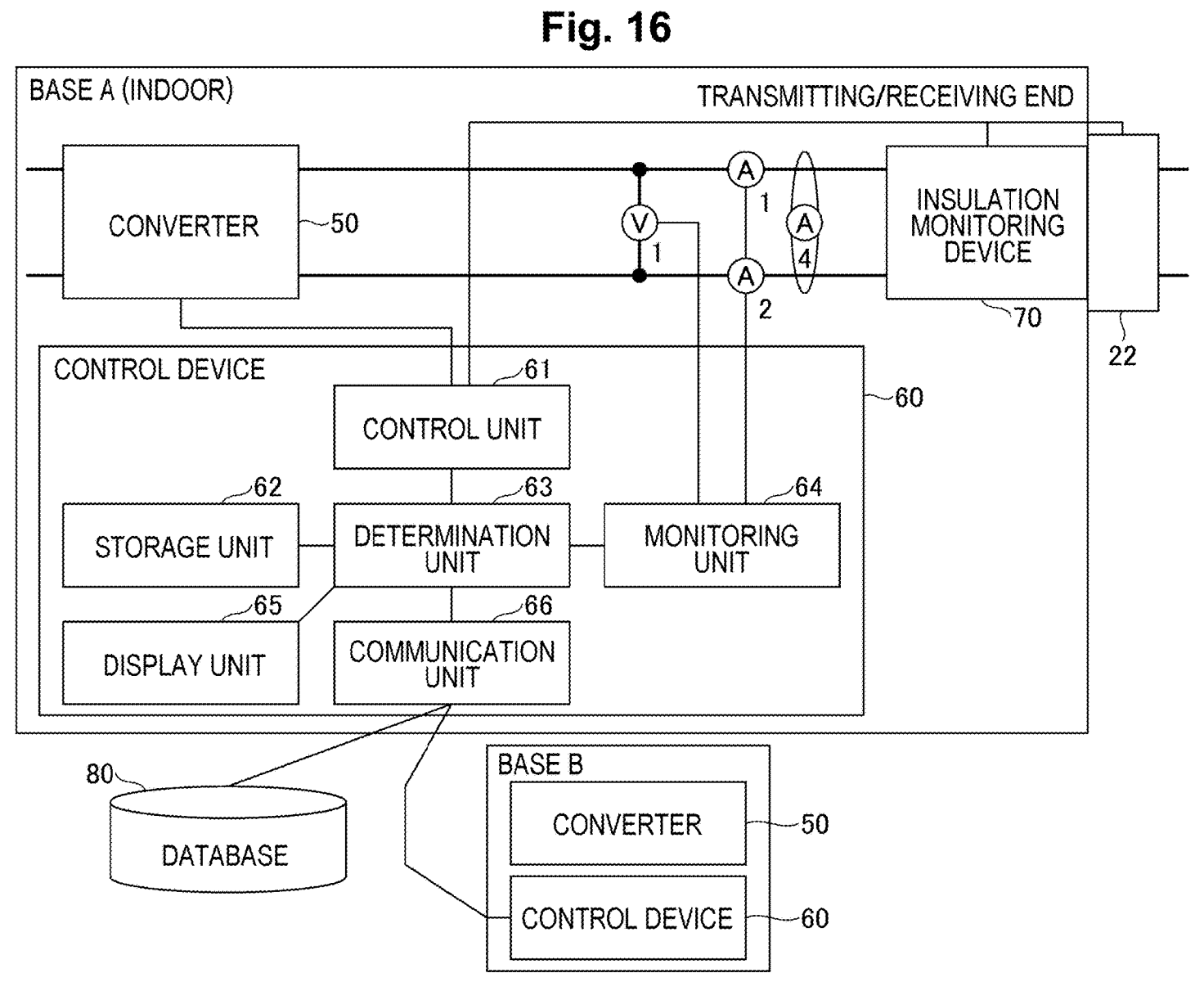

FIG. 16 is a diagram illustrating a configuration of the power supply system according to Example 2 of the embodiment of the present invention. In each base, a control device for controlling the converter of each base and the breaker disposed in a power feeding network is installed. In a base A, a converter 50, a control device 60, and an insulation monitoring device 70 are installed.

The control device 60 includes a control unit 61, a storage unit 62, a determination unit 63, a monitoring unit 64, a display unit 65, and a communication unit 66. The control unit 61 controls the converter 50 and a breaker 22. The storage unit 62 stores information such as a threshold necessary for control.

The determination unit 63 performs determination processing for determining the operation mode of each converter, determining a power feeding path, and the like. The monitoring unit 64 monitors the operation mode of the power feeding by the converter 50 by using a detection result by an ammeter, a voltmeter, or the like. The display unit 65 displays control contents. The communication unit 66 communicates with a database 80 and the control device 60 (installed in another base (base B, etc.)).

The database 80 stores a learned model or the like generated by performing analysis, learning, or the like. Note that the database 80 may be a centralized type or a distributed type database.

Next, the operation of the control device 60 will be described.

Figure 17:
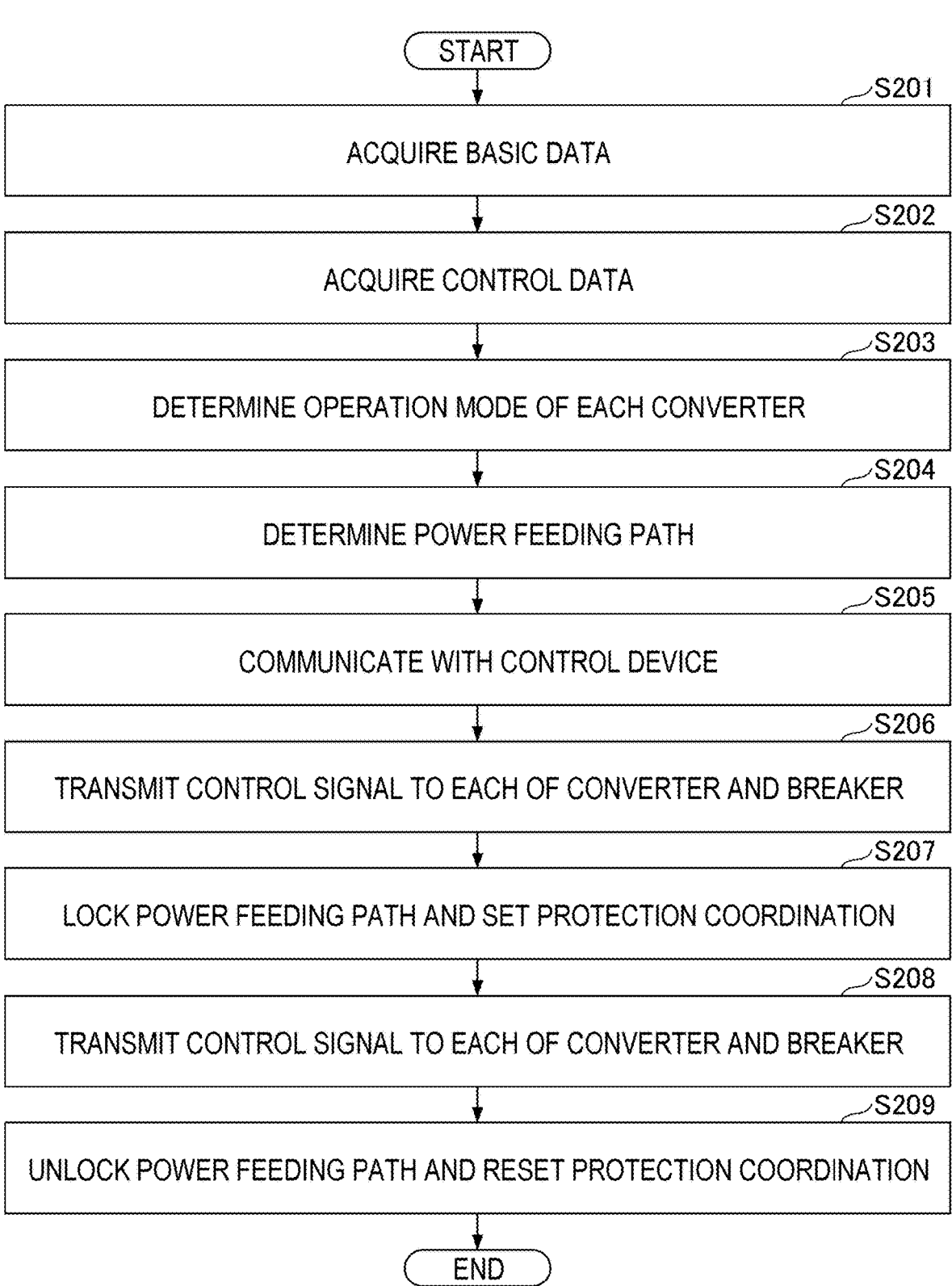
FIG. 17 is a flowchart illustrating an example of a flow of control processing according to Example 2 of the embodi-ment of the present invention.

FIG. 17 is a flowchart illustrating an example of a flow of control processing according to Example 2 of the embodiment of the present invention.

The control device 60 acquires basic data (step S201). The basic data may include, for example, a GB operation time, an X-capacitor capacity, cable impedance, fuse blowout characteristics, a power network configuration, slot type breaker information, currently locked route information, or the like.

Next, the control device 60 acquires control data (step S202). The control data may include a specification of a power transmittable converter, a specification of a power receivable converter, PV power, SoC of a storage battery, a load capacity, weather information, weather forecast information, and the like. Note that the control device 60 may receive an input of the control data.

Next, the determination unit 63 determines the operation mode of each converter (step S203). Specifically, in a state where the converter 50 of the base A is transmitting the power to the base B, the determination unit 63 controls the converter 50 of the base B to be in the power reception mode, not in the power transmission mode. Here, the monitoring unit 64 detects the power transmission state by a control signal, a detector, or the like.

Similarly, in a state where the converter of the base B is transmitting the power to the base A, the determination unit 63 controls the converter 50 of the base A to be in the power reception mode, not in the power transmission mode.

Next, the determination unit 63 determines a power feeding path (step S204). Details of the power feeding path determination method will be described later.

Subsequently, the communication unit 66 communicates with the control device (step S205). Note that, when the operation mode changes, the control device 60 may execute the handshaking procedure illustrated in FIG. 15. Then, the control unit 61 transmits the control signal to each of the converter 50 and the breaker 22 (step S206).

Subsequently, the control unit 61 locks at least one power feeding path and sets protection coordination (step S207). A method of locking the power feeding path and setting the protection coordination will be described later.

The control unit 61 transmits the control signal to each of the converter 50 and the breaker 22 in accordance with setting contents (step S208). When detecting the elapse of a certain period of time, or receiving an emergency stop signal, the control unit 61 unlocks the power feeding path and resets the protection coordination (step S209).

Subsequently, the method of determining the power feeding path in step S204 of FIG. 17 described above will be described.

Figure 18:
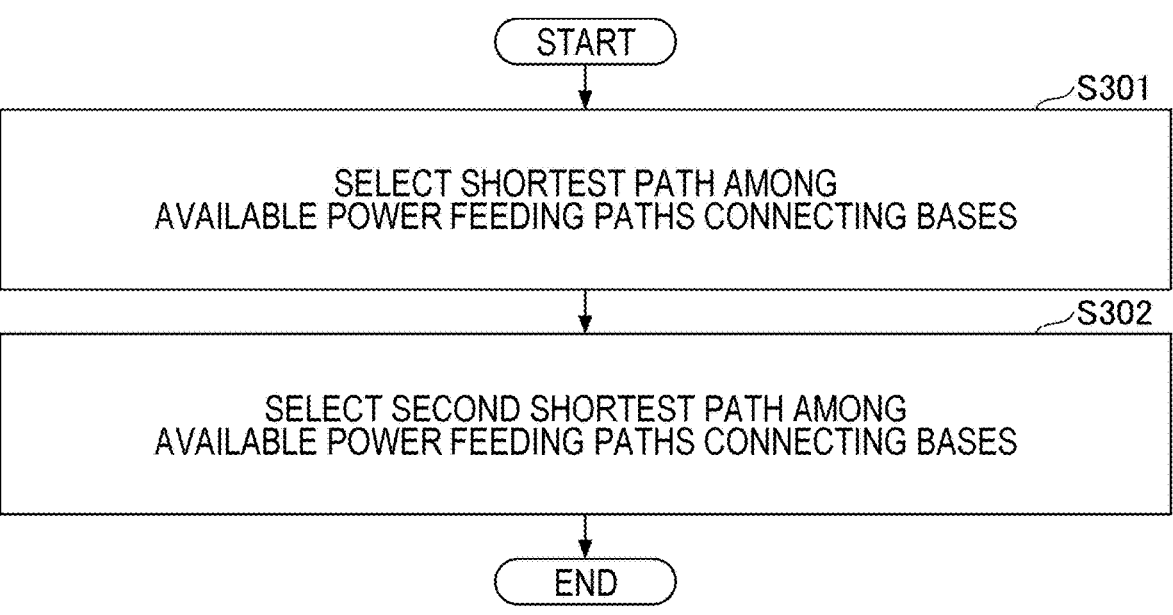
FIG. 18 is a flowchart illustrating an example of a flow of power feeding path determination processing according to Example 2 of the embodiment of the present invention.

FIG. 18 is a flowchart illustrating an example of the flow of power feeding path determination processing according to Example 2 of the embodiment of the present invention.

The determination unit 63 selects a shortest path among available power feeding paths that connect bases (step S301). Next, the determination unit 63 selects a second shortest path among available power feeding paths that connect bases (step S302).

Although FIG. 18 illustrates a configuration example of the power feeding in a one-to-one manner, the determination unit 63 may provide a current threshold for the power feeding in an n-to-n manner and may execute similar interlocking. In a case of n-to-n power feeding, an interlocking condition may include not only a condition in which interlocking is based on the power transmission mode and the power reception mode but also a condition in which a sum of transmission power and a sum of reception power (+power transmission loss) match.

Figure 19:
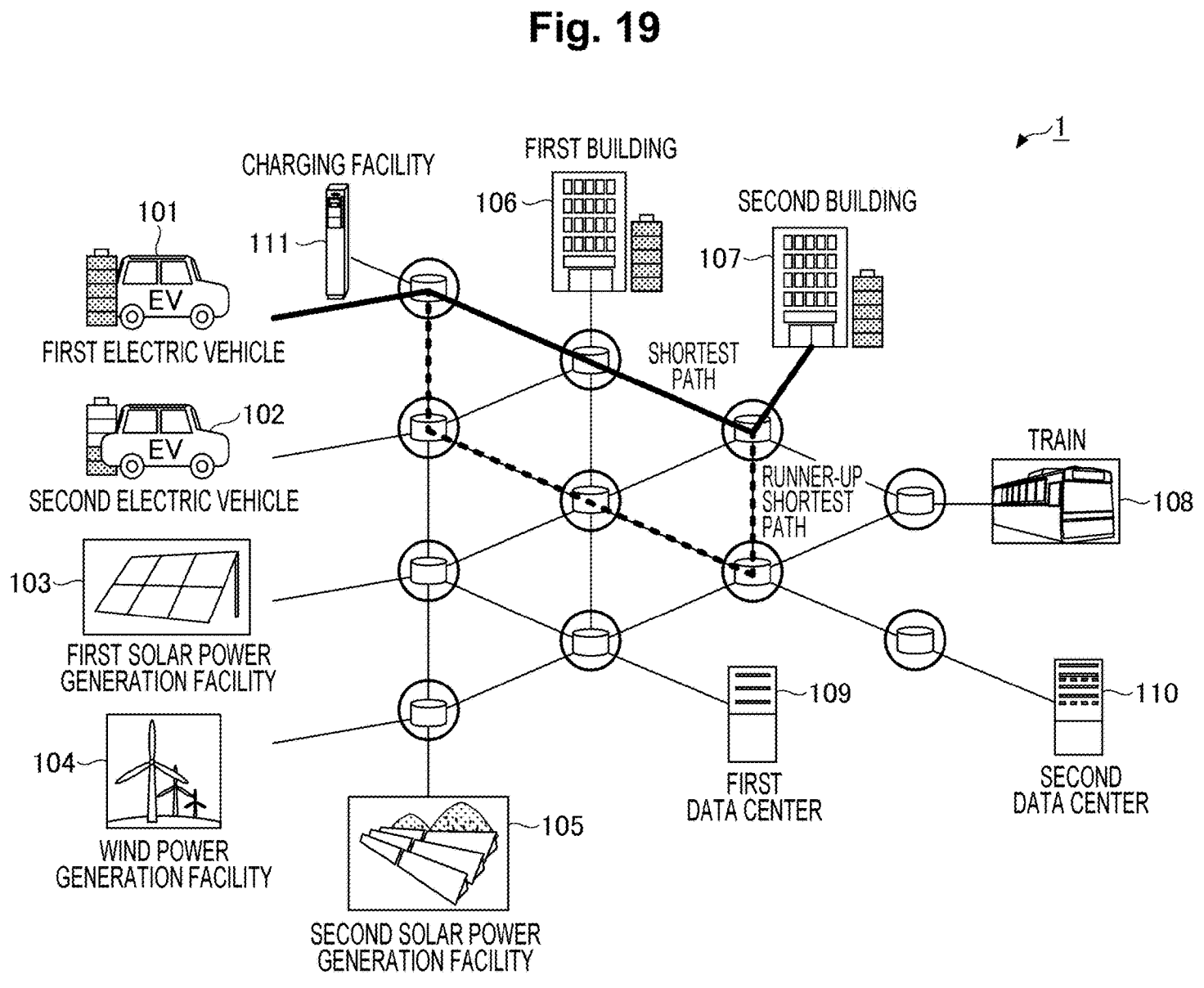

FIG. 19 is a first diagram for explaining a power feeding path determination method according to Example 2 of the embodiment of the present invention.

FIG. 19 illustrates the method of determining the power feeding path in the case of one-to-one power feeding. In the case of one-to-one power feeding, the determination unit 63 determines the shortest path and the second shortest path. By determining a plurality of power feeding paths, impedance of the power feeding path can be reduced, and wiring loss can be also reduced.

Figure 20:
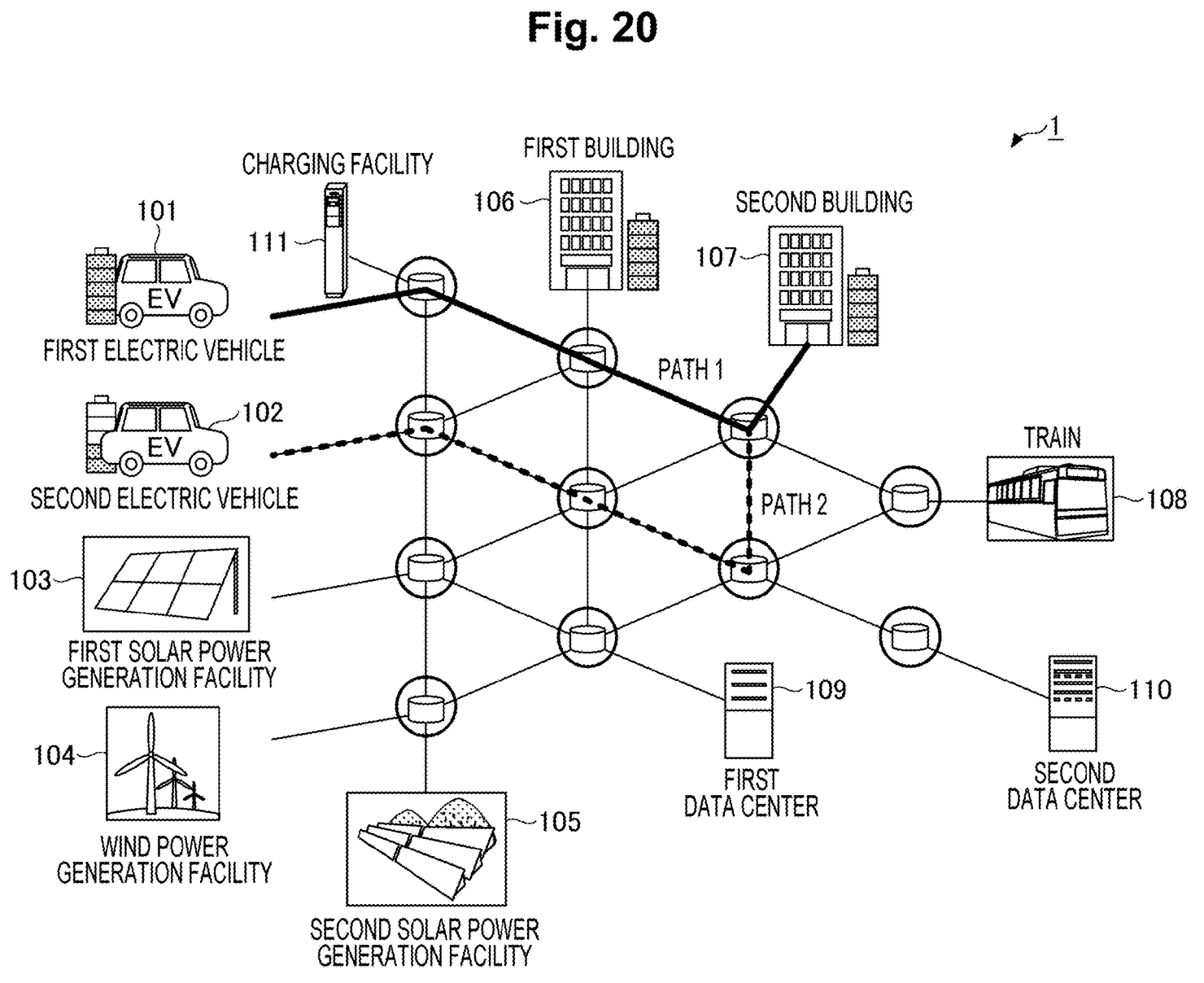

FIG. 20 is a second diagram for explaining a power feeding path determination method according to Example 2 of the embodiment of the present invention.

FIG. 20 illustrates the method of determining the power feeding path in the case of one-to-two power feeding. In the case of one-to-two power feeding, the determination unit 63 determines, for example, a path for supplying power from the second building 107 to the first electric vehicle 101 (path 1) and to the second electric vehicle 102 (path 2). Since there is a branch of the feeder line, it is necessary to limit the maximum current before and after the branch for protection coordination at the branch point.

Subsequently, the method of locking the power feeding path and setting the protection coordination in step S207 of FIG. 17 described above will be described.

Figure 21:
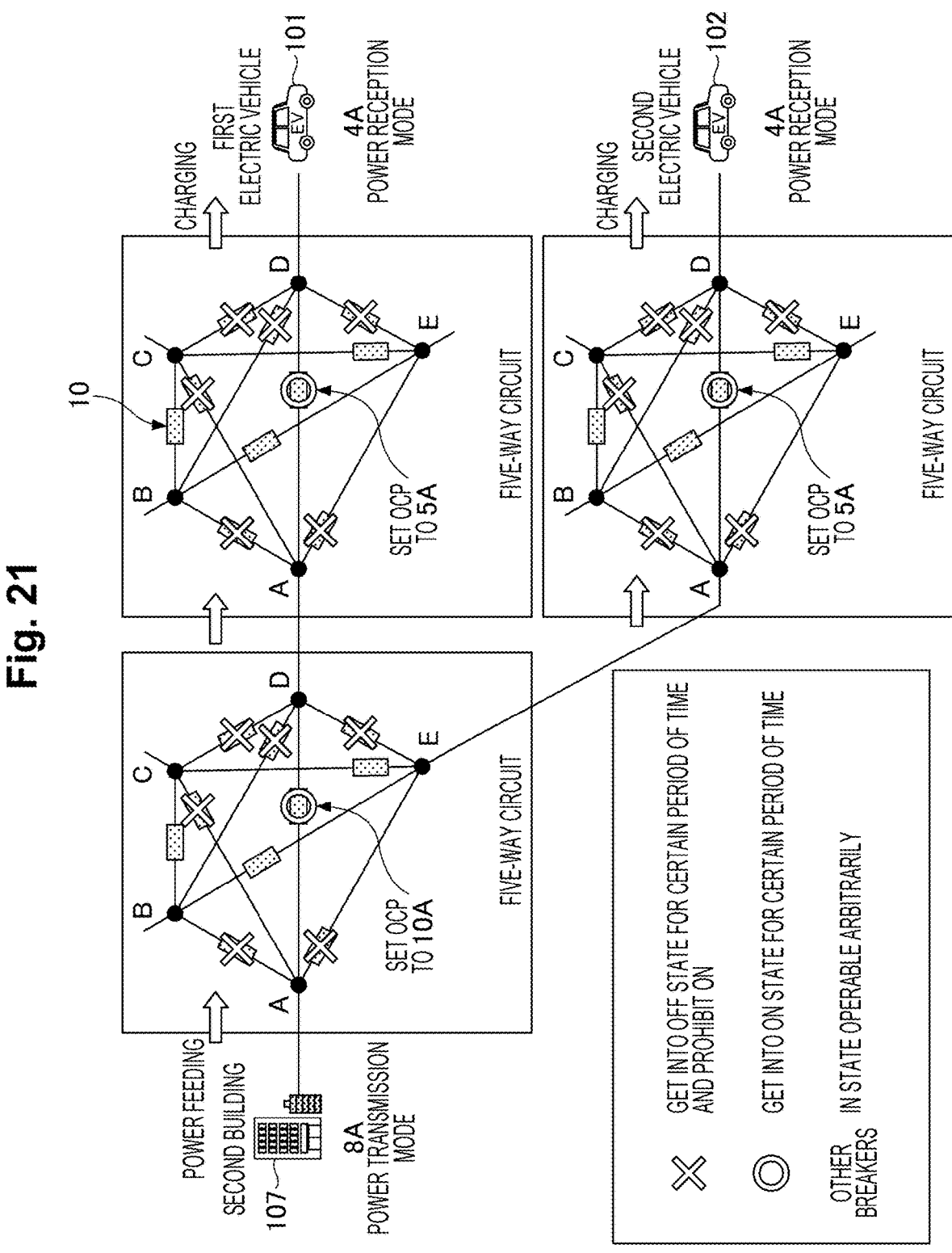
FIG. 21 is a diagram for explaining a method of locking the power feeding path and setting the protection coordina-tion according to Example 2 of the embodiment of the present invention.

FIG. 21 is a diagram for explaining the method of locking the power feeding path and setting the protection coordination according to Example 2 of the embodiment of the present invention.

The control unit 61 turns on all breakers 22 installed along a power feeding path that connects a converter 50 in the power transmission mode and a converter 50 in the power reception mode. Moreover, the control unit 61 maintains all breakers 22 installed along a path that intersects the power feeding path, in an OFF state (interlocking). Moreover, the control unit 61 recognizes that the other breakers 22 are usable in another route. In this manner, the control unit 61 executes locking of the power feeding path.

Moreover, the control unit 61 sets the OCP of the breaker 22 according to the number of branches of the path like a fuse, a wiring breaker, or the like. In this way, the control unit 61 executes setting of the protection coordination. This eliminates the need for cost, time, and the like for constructing a new route.

It is possible to implement the control device 60, for example, by causing a computer to execute a program in which the processing contents described in the present embodiment are described. Note that the "computer" may be a physical machine or a virtual machine on a cloud. In a case where a virtual machine is used, "hardware" described herein is virtual hardware.

The above program can be stored and distributed by being recorded on a computer-readable recording medium (portable memory, etc.). The above program can also be provided through a network such as the Internet or an electronic mail.

Figure 22:
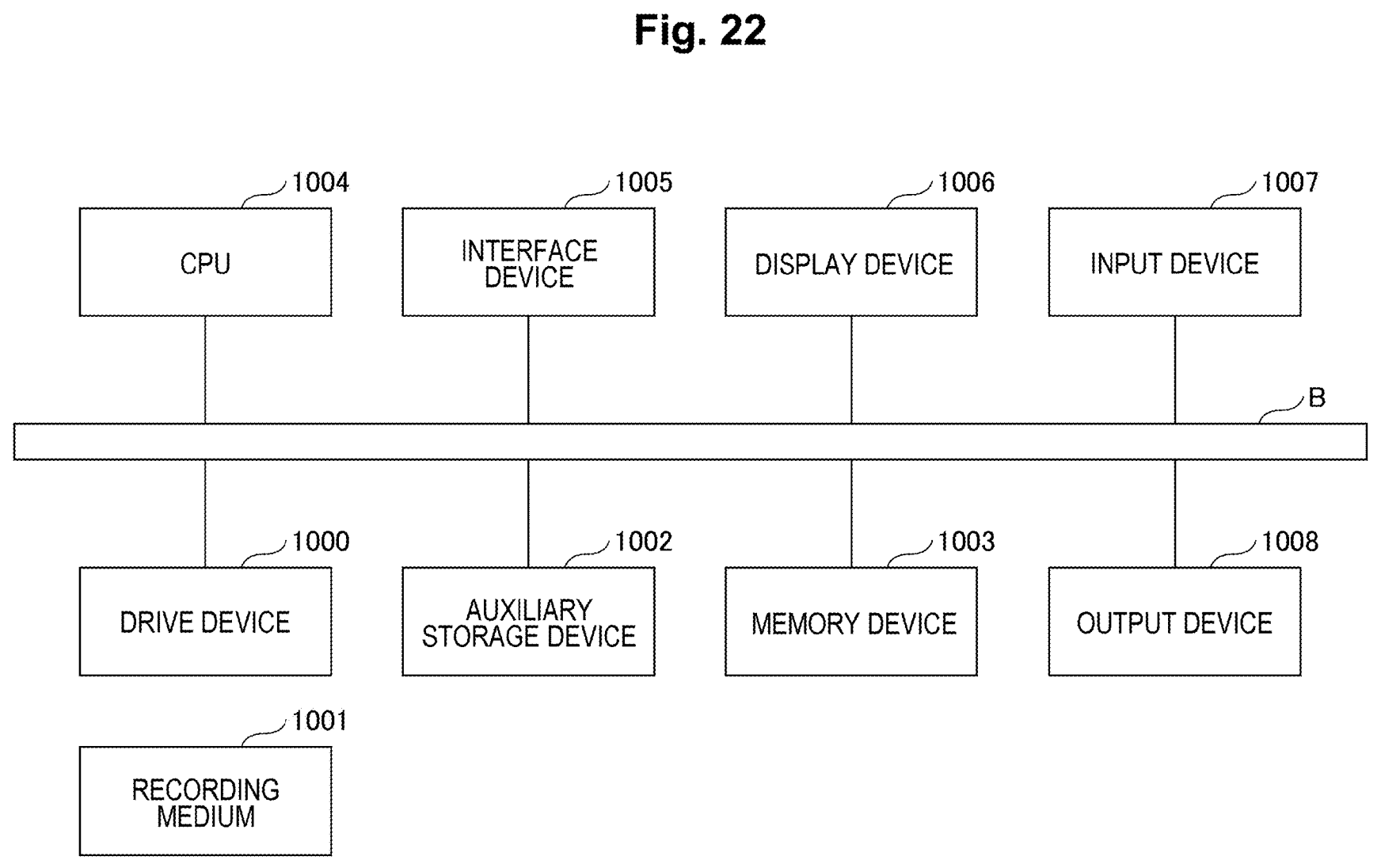

FIG. 22 is a diagram illustrating a hardware configuration example of the computer. The computer in FIG. 22 includes a drive device 1000, an auxiliary storage device 1002, a memory device 1003, a CPU 1004, an interface device 1005, a display device 1006, an input device 1007, an output device 1008, and the like, which are connected with each other by a bus B.

A program for implementing processing in the computer is provided through a recording medium 1001, such as a CD-ROM or a memory card, for example. When the recording medium 1001 storing the program is set in the drive device 1000, the program is installed from the recording medium 1001 to the auxiliary storage device 1002 via the drive device 1000. However, the program is not necessarily installed from the recording medium 1001, and may be downloaded from another computer via a network. The auxiliary storage device 1002 stores the installed program, and also stores necessary files, data, and the like.

When an instruction to start the program is made, the memory device 1003 reads the program from the auxiliary storage device 1002 and stores the program. The CPU 1004 implements a function related to the device in accordance with the program stored in the memory device 1003. The interface device 1005 is used as an interface for connection to a network. The display device 1006 displays a graphical user interface (GUI) or the like according to the program. The input device 1007 is configured with a keyboard and a mouse, a button, a touch panel, or the like, and is used to input various operation instructions. The output device 1008 outputs a computation result. Note that the computer may include a graphics processing unit (GPU) or a tensor processing unit (TPU) instead of the CPU 1004, or may include a GPU or a TPU in addition to the CPU 1004. In that case, for example, processing may be shared and executed such that the GPU or the TPU executes processing requiring special computation and the CPU 1004 executes other processing.

In this example, the control device 60 realizes the interlocking function and the protection coordination function by locking the power feeding path and setting the protection coordination. By interlocking for a certain period of time, cables (routes) related to power feeding and power reception can be separated from other power feeding routes in a pseudo manner, and an independent safe route can be constructed. Moreover, physical extension reconstruction is not required to change the route.

Moreover, in a case where power interchange is bidirectionally performed by the converter, even when a short circuit occurs in outdoor wiring via a large resistor, all the converters do not get into the power transmission state at the same time, and an accident can be detected.

As a result, it is possible to improve the safety of the power feeding path in the power supply system capable of coping with a complicated network.

Example 3

In this example, an example of realizing integration of the branch breaking circuit will be described.

Figure 23:
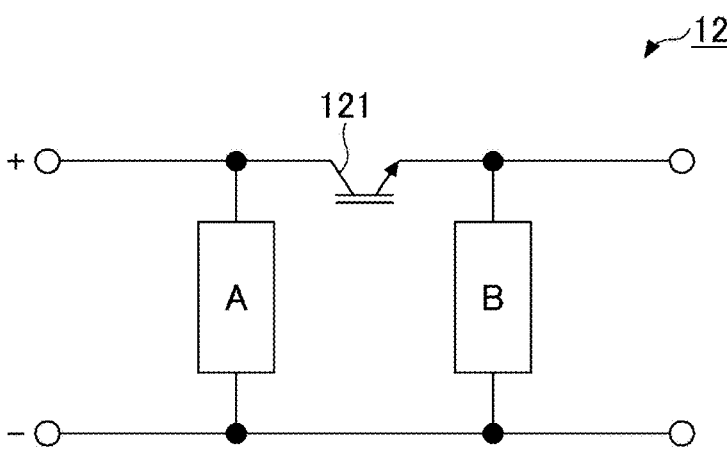
FIG. 23 is a diagram for explaining a conventional breaking circuit.

FIG. 23 is a diagram for explaining a conventional breaking circuit. An internal circuit 12 includes a switch 121, and A and B. In A of FIG. 23, a capacitor or the like is used to suppress voltage fluctuation when the circuit is broken for a short time. In B of FIG. 23, a capacitor, a diode, or the like is used to suppress overvoltage when the circuit is broken for a long time.

Figure 24:
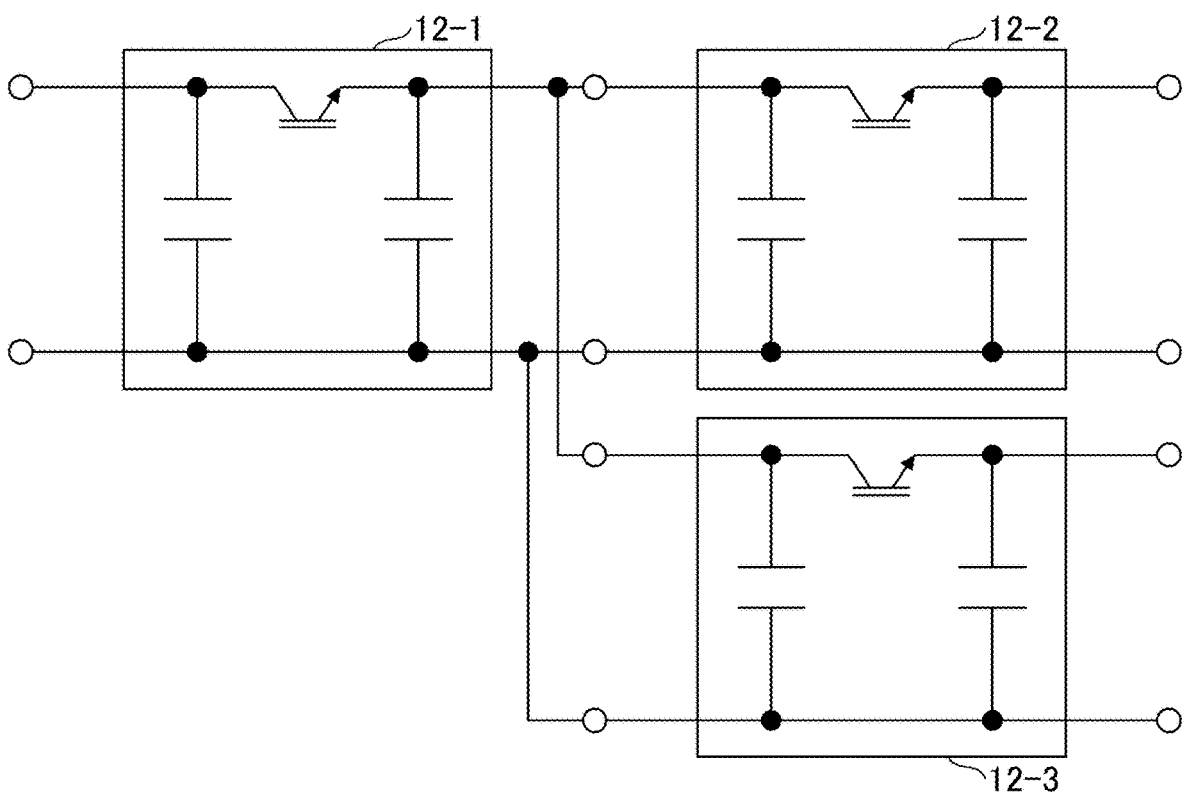
FIG. 24 is a diagram for explaining a conventional branch breaking circuit.

FIG. 24 is a diagram for explaining the conventional branch breaking circuit. Conventionally, as illustrated as internal circuits 12-1 to 12-3 of FIG. 24, branching has been realized by arranging the circuits of FIG. 23. That is, the branch breaking circuit has not been conventionally regarded as an integrated device.

Figure 25:
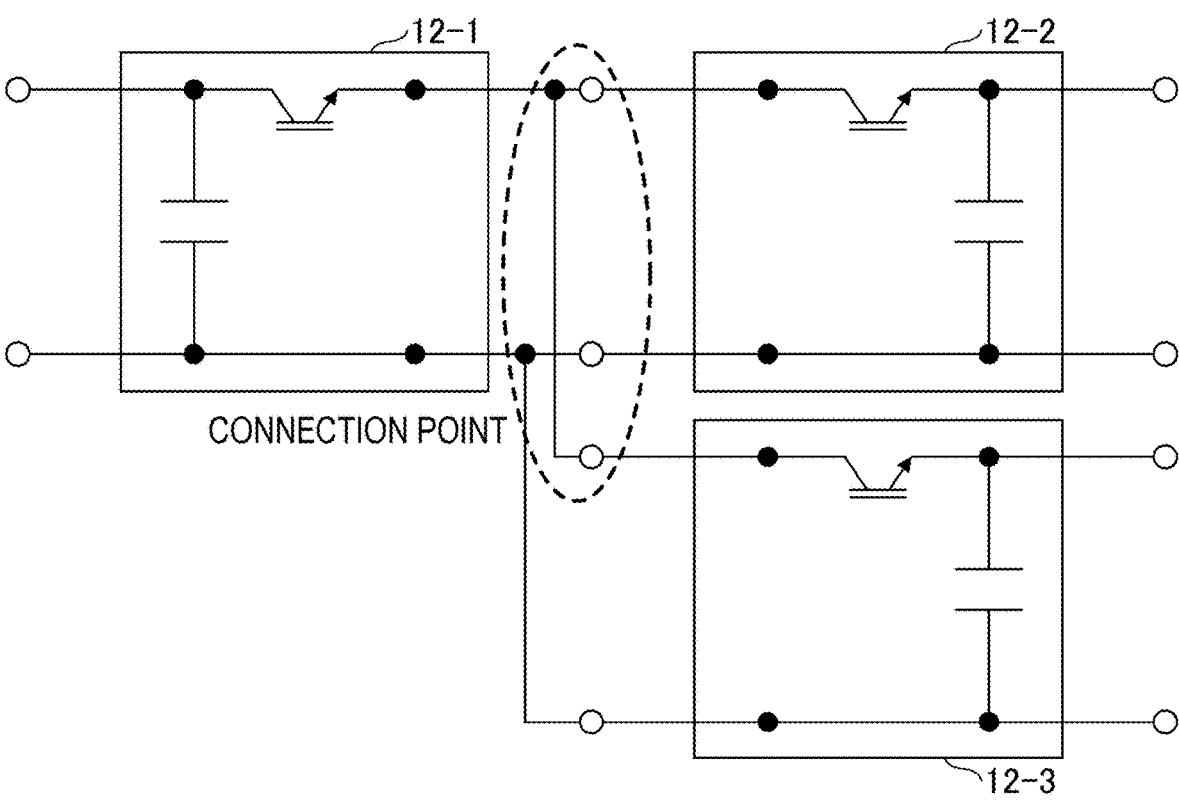
FIG. 25 is a diagram illustrating an example of a branch breaking circuit according to Example 3 of the embodiment of the present invention.

FIG. 25 is a diagram illustrating an example of a branch breaking circuit according to Example 3 of the embodiment of the present invention. As described in Example 2, by controlling operations of the breakers in cooperation, a connection point side of each breaker does not have a connection with a load device and the like any more, and a capacitor, a diode, and the like become unnecessary. Therefore, they are removed and an integrated configuration (systemization) is achieved.

Figure 26:
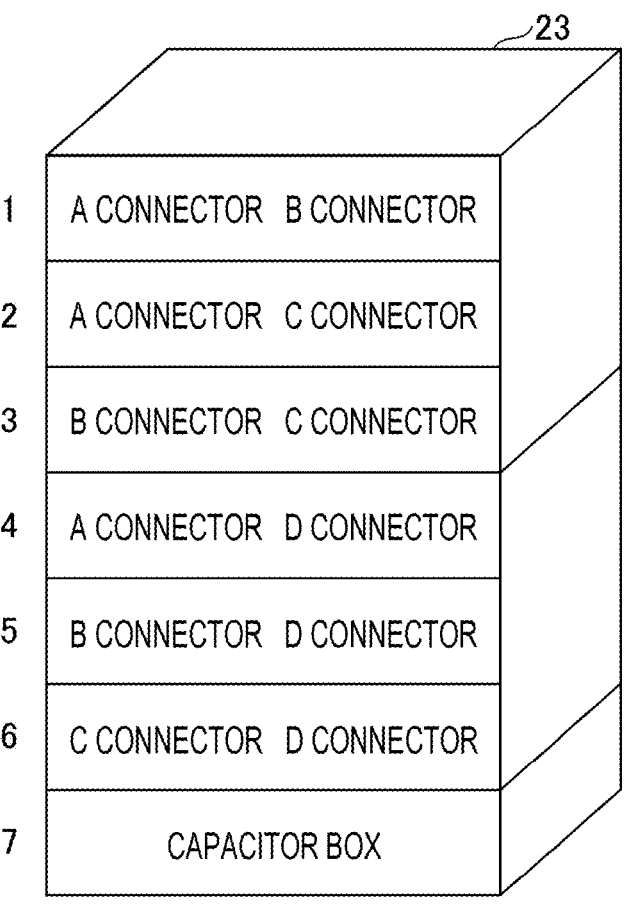
FIG. 26 is a diagram illustrating an example of a housing of a breaker according to Example 3 of the embodiment of the present invention.

FIG. 26 is a diagram illustrating an example of the housing of the breaker according to Example 3 of the embodiment of the present invention. A housing 23 has a capacitor box in a seventh slot. The slot may be replaced according to the condition (rated current, voltage suppression level, etc.). Moreover, capacitors that are likely to deteriorate may be slotted and replaced.

Figure 27:
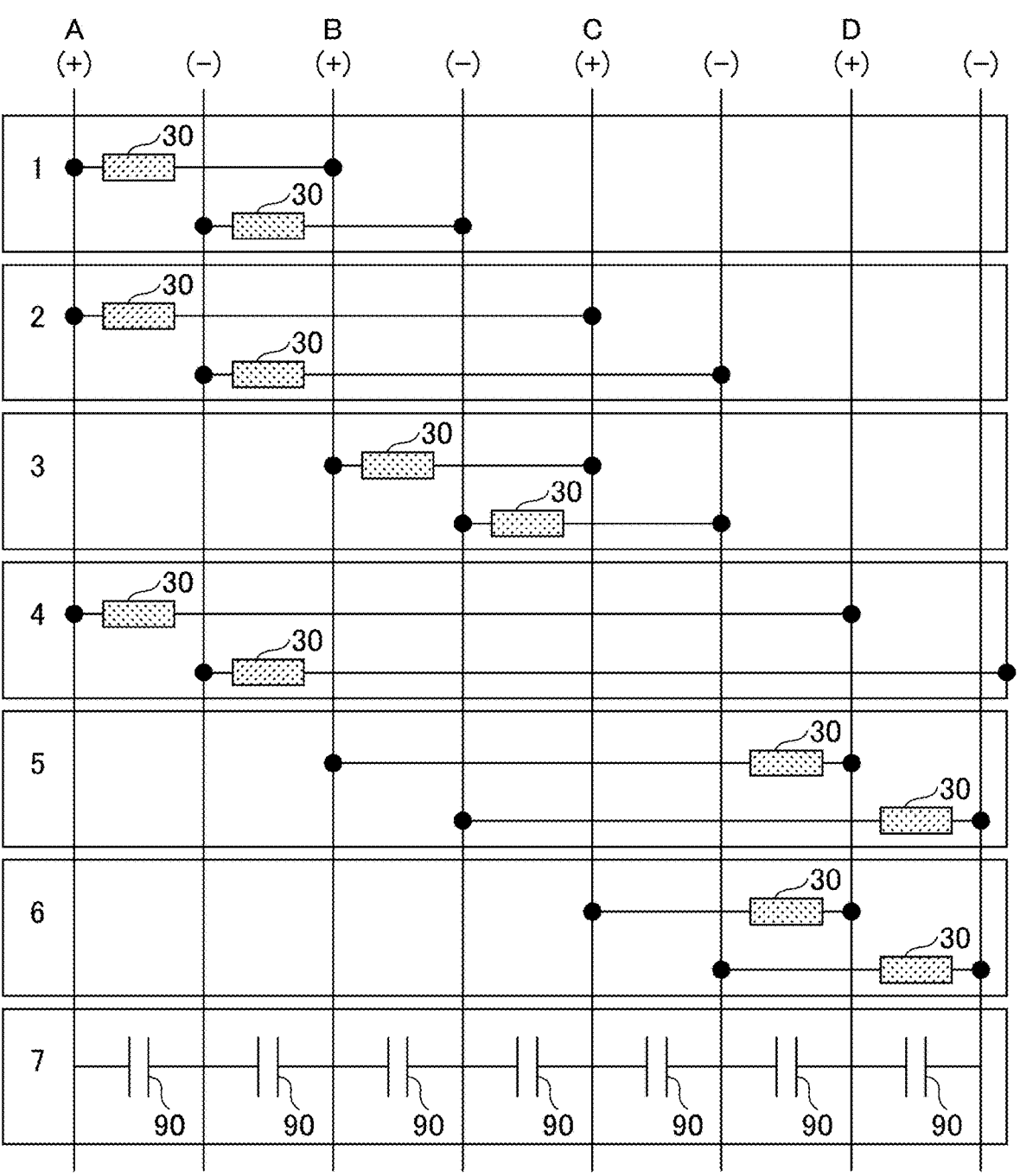
FIG. 27 is a diagram illustrating an example of a circuit of a breaker according to Example 3 of the embodiment of the present invention.

FIG. 27 is a diagram illustrating an example of the circuit of the breaker according to Example 3 of the embodiment of the present invention. As in the example in the multi-line connection diagram illustrated in FIG. 27, the branch breaking circuit illustrated in FIG. 25 can be implemented by mounting a capacitor 90 on the output side of each port.

According to this example, the capacitor, the diode, and the like on the connection point side of each breaker are eliminated and an integrated configuration is achieved. As a result, the cost of the breaker is reduced, and downsizing is realized. Accordingly, it is possible to realize integration of the branch breaking circuit capable of coping with a complicated network.

Summary of Embodiment

In the present specification, at least a control device, a power supply system, a control method, and a program described in the following clauses are described.
(Clause 1)
A control device including:
a communication unit configured to communicate with a control device of another base in a power supply system before power interchange; and
a control unit configured to lock a power feeding path for a certain period of time and control a converter and a breaker disposed in a power feeding network on the basis of a power feeding path determined not to intersect with another power feeding path during power feeding.
(Clause 2)
The control device according to clause 1,
in which the control unit is configured to set a current amount for over current protection in a breaker so as to achieve protection coordination.
(Clause 3)
The control device according to clause 1 or 2,
in which the power feeding path is determined on a condition that a sum of transmission power and a sum of reception power match.
(Clause 4)
The control device according to clause 1 or 2,
in which the power feeding path is determined as a plurality of paths including a shortest path.
(Clause 5)
A power supply system including a control device, a converter, and a breaker,
in which the breaker is disposed in a power feeding network, and
the control device includes:
a communication unit configured to communicate with a control device of another base in the power supply system before power interchange; and a control unit configured to lock a power feeding path for a certain period of time and control the converter and the breaker on the basis of a power feeding path determined not to intersect with another power feeding path during power feeding.
(Clause 6)
A control method executed by a control device, the control method including:
a step of communicating with a control device of another base in a power supply system before power interchange; and
a step of locking a power feeding path for a certain period of time and controlling a converter and a breaker disposed in a power feeding network on the basis of a power feeding path determined not to intersect with another power feeding path during power feeding.
(Clause 7)
A program for causing a computer to execute:
a step of communicating with a control device of another base in a power supply system before power interchange; and
a step of locking a power feeding path for a certain period of time and controlling a converter and a breaker disposed in a power feeding network on the basis of a power feeding path determined not to intersect with another power feeding path during power feeding.

Although the present embodiment has been described above, the present invention is not limited to such a specific embodiment, and various modifications and changes can be made within the scope of the gist of the present invention described in accompanying claims.

REFERENCE SIGNS LIST

1 Power supply system
10 Breaking unit
11 Connector
12 Internal circuit
20, 21 Housing
22 Breaker
30 Slot
40 Breaking unit
50 Converter
60 Control device
61 Control unit
62 Storage unit
63 Determination unit
64 Monitoring unit
65 Display unit
66 Communication unit
70 Insulation monitoring device
80 Database
101 First electric vehicle
102 Second electric vehicle
103 First solar power generation facility
104 Wind power generation facility
105 Second solar power generation facility
106 First building
107 Second building
108 Train
109 First data center
110 Second data center
111 Charging facility
121 Switch
122 Capacitor
123 Diode
901 Two-way breaker

902 Three-way breaker
903 Four-way breaker
904 Five-way breaker
905 Six-way breaker
1000 Drive device
1001 Recording medium
1002 Auxiliary storage device
1003 Memory device
1004 CPU
1005 Interface device
1006 Display device
1007 Input device
1008 Output device

The invention claimed is:

1. A control apparatus comprising:
circuitry configured to
    communicate with a second control apparatus at a different base from the control apparatus in a power supply system, before performing power interchange,
    lock at least one first power feeding path for a period of time, and
    control a converter and one or more breakers in a power feeding network based on the first power feeding path that is determined not to intersect with a second power feeding path different from the first power feeding path, during powering.

2. The control apparatus according to claim 1, wherein the circuitry is configured to set a current amount allowing for overcurrent protection of a given breaker so as to achieve protection coordination.

3. The control apparatus according to claim 1, wherein the circuitry is configured to determine the first power feeding path upon occurrence of a condition in which a sum of transmission power related with the first power feeding path is equal to a sum of reception power related with the first power feeding path.

4. The control apparatus according to claim 1, wherein the at least one first power feeding path includes a plurality of paths including a shortest path.

5. A power supply system comprising:
a control apparatus;
a converter; and
a plurality of breakers in a power feeding network,
wherein the control apparatus includes circuitry configured to:
    communicate with a second control apparatus at a different base from the control apparatus in the power supply system, before performing power interchange, and
    lock at least first power feeding path for a period of time, and
    control the converter and one or more breakers among the plurality of breakers, based on the first power feeding path that is determined not to intersect with a second power feeding path different from the first power feeding path, during powering.

6. A control method executed by a control apparatus, the control method comprising:
communicating with a second control apparatus at a different base from the control apparatus in a power supply system, before performing power interchange;
locking a first power feeding path for a period of time; and
controlling a converter and one or more breakers in a power feeding network based on the first power feeding path that is determined not to intersect with a second power feeding path different from the first power feeding path, during powering.

7. A non-transitory computer readable medium storing a program for causing a computer to execute the control method of claim 6.

* * * * *